(12) United States Patent
Tononishi

(10) Patent No.: US 10,763,469 B2
(45) Date of Patent: Sep. 1, 2020

(54) ENERGY STORAGE APPARATUS

(71) Applicant: GS Yuasa International Ltd., Kyoto-shi (JP)

(72) Inventor: Masamitsu Tononishi, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 0 days.

(21) Appl. No.: 15/759,782

(22) PCT Filed: Sep. 15, 2016

(86) PCT No.: PCT/JP2016/077220
§ 371 (c)(1),
(2) Date: Mar. 13, 2018

(87) PCT Pub. No.: WO2017/047683
PCT Pub. Date: Mar. 23, 2017

(65) Prior Publication Data
US 2018/0358587 A1  Dec. 13, 2018

(30) Foreign Application Priority Data

Sep. 18, 2015 (JP) ................................. 2015-186038

(51) Int. Cl.
| | | |
|---|---|---|
| *H01M 2/10* | (2006.01) | |
| *H01G 11/10* | (2013.01) | |
| *H01M 2/14* | (2006.01) | |
| *H01G 2/04* | (2006.01) | |
| *H01M 2/18* | (2006.01) | |
| *H01G 9/08* | (2006.01) | |
| *H01G 9/26* | (2006.01) | |

(52) U.S. Cl.
CPC ............ *H01M 2/1016* (2013.01); *H01G 2/04* (2013.01); *H01G 11/10* (2013.01); *H01M 2/10* (2013.01); *H01M 2/14* (2013.01); *H01M 2/18* (2013.01); *H01G 9/08* (2013.01); *H01G 9/26* (2013.01)

(58) Field of Classification Search
None
See application file for complete search history.

(56) References Cited

U.S. PATENT DOCUMENTS

2004/0016455 A1   1/2004 Oogami
2006/0204840 A1*  9/2006 Jeon ................... H01M 2/1077
                                                                  429/152

(Continued)

FOREIGN PATENT DOCUMENTS

EP    2 541 647 A2    1/2013
EP    2 790 249 A1   10/2014

(Continued)

OTHER PUBLICATIONS

Ogami (JP, 2004-055446) (a raw machine translation) (Abstract) (Feb. 19, 2004) (Year: 2004).*

(Continued)

*Primary Examiner* — Carmen V Lyles-Irving
(74) *Attorney, Agent, or Firm* — McGinn I.P. Law Group, PLLC.

(57) ABSTRACT

An energy storage apparatus includes: one or more energy storage devices; an outer case; and a plate-like spacer disposed between the energy storage device at an end among the above-mentioned one or more energy storage devices and the outer case.

18 Claims, 11 Drawing Sheets

(56) References Cited

U.S. PATENT DOCUMENTS

| | | | | |
|---|---|---|---|---|
| 2012/0227931 | A1* | 9/2012 | Heckenberger | H01M 2/021 |
| | | | | 165/41 |
| 2013/0171478 | A1 | 7/2013 | Ushijima | |
| 2014/0315072 | A1* | 10/2014 | Kobayashi | H01M 2/0217 |
| | | | | 429/156 |
| 2015/0144409 | A1* | 5/2015 | Fujii | B60L 11/1879 |
| | | | | 180/65.1 |
| 2017/0352850 | A1* | 12/2017 | Nagane | H01M 2/1077 |

FOREIGN PATENT DOCUMENTS

| | | |
|---|---|---|
| EP | 2 874 201 A1 | 5/2015 |
| JP | S 61-062362 U | 4/1986 |
| JP | 2004-055446 A | 2/2004 |
| JP | 2013-073918 A | 4/2013 |
| JP | 2013-152923 A | 8/2013 |
| JP | 2013-164969 A | 8/2013 |
| JP | 2014-203743 A | 10/2014 |
| JP | 2014-203747 A | 10/2014 |
| JP | 2015-069768 A | 4/2015 |
| JP | 2015-082492 A | 4/2015 |
| JP | 2015-125824 A | 7/2015 |
| JP | 2015-138649 A | 7/2015 |
| JP | 2015-164101 A | 9/2015 |
| JP | 2016-009585 A | 1/2016 |

OTHER PUBLICATIONS

Ogami (JP, 2004-055446) (a raw machine translation) (Detailed Description) (Feb. 19, 2004) (Year: 2004).*

Ogami (JP, 2004-055446) (a raw machine translation) (Drawings) (Feb. 19, 2004) (Year: 2004).*

International Search Report (ISR) (PCT Form PCT/ISA/210), in PCT/JP2016/077220, dated Dec. 6, 2016.

* cited by examiner (a)

(b)

ENERGY STORAGE APPARATUS

TECHNICAL FIELD

The present invention relates to an energy storage apparatus which includes one or more energy storage devices and an outer case.

BACKGROUND ART

Conventionally, in an energy storage apparatus which includes a plurality of energy storage devices, there has been known the configuration where a member is disposed around the plurality of energy storage devices for forming a space to absorb an impact (see patent document 1, for example). With such a configuration, even when an impact is applied to the energy storage apparatus, the energy storage apparatus can absorb the impact.

PRIOR ART DOCUMENT

Patent Document

Patent Document 1: JP-A-2013-164969

SUMMARY OF THE INVENTION

Problems to be Solved by the Invention

However, the configuration which absorbs an impact by a space as in the case of the above-mentioned conventional energy storage apparatus, there may be a case where an impact cannot be sufficiently absorbed. In such a case, there is a concern that the energy storage device is not protected from the impact so that the energy storage device is deformed or damaged.

The present invention has been made to overcome the above-mentioned drawbacks, and it is an object of the present invention to provide an energy storage apparatus in which an energy storage device can be protected from an impact.

Means for Solving the Problems

To achieve the above-mentioned object, an energy storage apparatus according to one aspect of the present invention includes one or more energy storage devices, an outer case, and a plate-like spacer disposed between the energy storage device disposed at an end among the one or more energy storage devices and the outer case.

Advantages of the Invention

According to the energy storage apparatus of the present invention, it is possible to protect the energy storage device from an impact.

MODE FOR CARRYING OUT THE INVENTION

Figure 1:
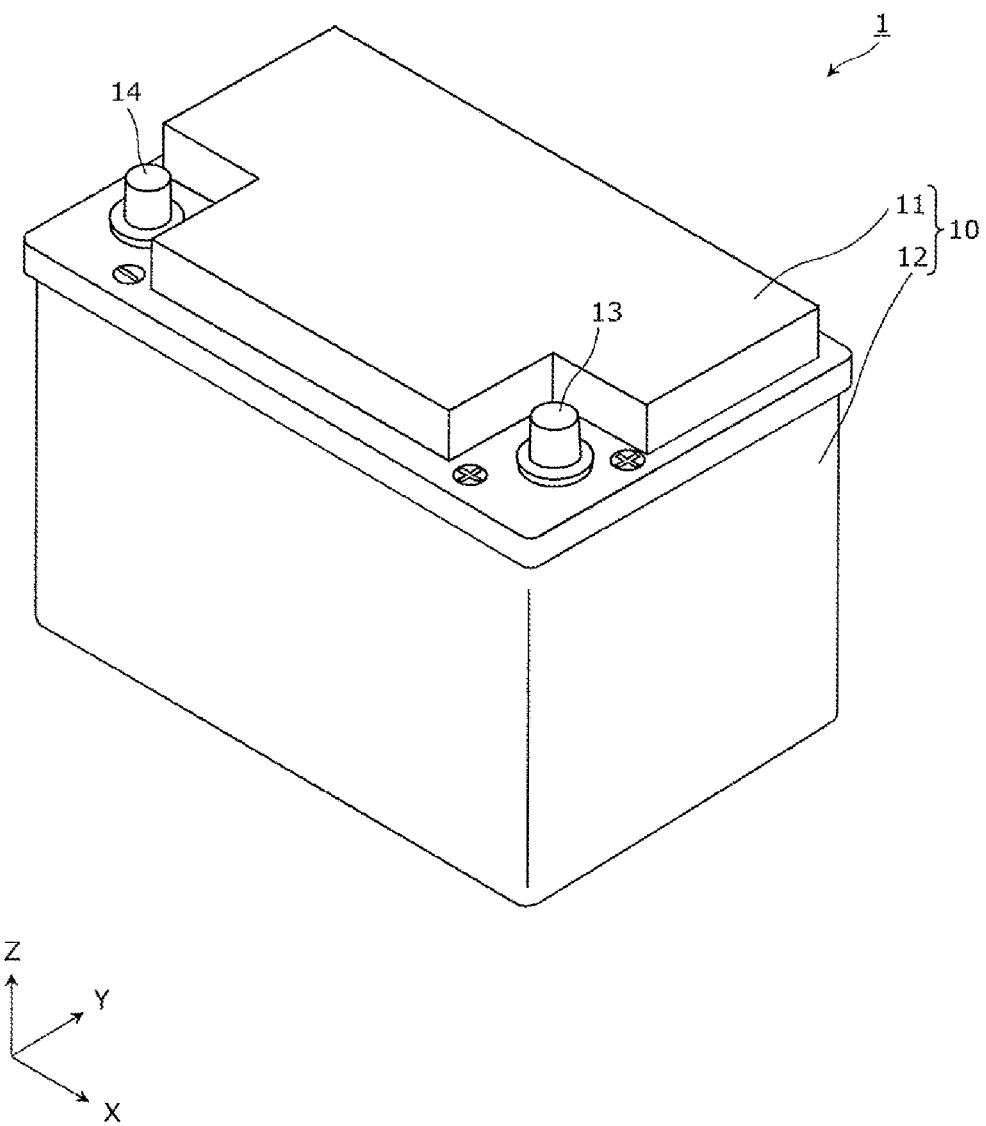
FIG. 1 is a perspective view showing an external appearance of an energy storage apparatus according to an embodiment.

To achieve the above-mentioned object, an energy storage apparatus according to one aspect of the present invention includes one or more energy storage devices and an outer case, a plate-like spacer disposed between the energy storage device disposed at an end among the one or more energy storage devices and the outer case.

With such a configuration, the spacer is disposed between the energy storage device disposed at the end and the outer case and hence, an impact applied to the outer case can be absorbed by collapsing of the spacer. Accordingly, it is possible to protect the energy storage device from the impact.

The energy storage apparatus further includes an end plate disposed on a side of the energy storage device disposed at the end among the one or more energy storage devices, and the spacer is disposed between the end plate and the outer case.

With such a configuration, the plate-like spacer is disposed between the end plate and the outer case and hence, an impact applied to the outer case can be absorbed by collapsing of the spacer. Accordingly, it is possible to protect the energy storage device from the impact.

The outer case may include a body portion and a lid portion, and the spacer may be disposed between the end plate and a side wall of the body portion.

With such a configuration, the spacer is disposed between the end plate and the body portion of the outer case and hence, it is possible to protect the energy storage device from an impact applied to the body portion.

The spacer may be disposed at a position which is approximately parallel to the end plate.

With such a configuration, the spacer is disposed at the position which is approximately parallel to the end plate and hence, the end plate can receive an impact applied to the outer case by a face via the spacer. Accordingly, it is possible to protect the energy storage device.

The end plate may include two end plates which are positioned so as to oppositely face each other and sandwich one or more energy storage devices, the spacer may include two spacers, and each of the two spacers may be disposed between each of the two end plates and the outer case.

With such a configuration, two spacers sandwiches the energy storage device and hence, it is possible to protect the energy storage device more securely.

The spacer may include a base plate which extends in an oppositely facing manner with the end plate, and a projecting portion projecting from the base plate.

With such a configuration, a load generated by an impact applied to the outer case is likely to be larger at the projecting portion projecting from the base plate than at the base plate. Accordingly, the impact applied to the outer case can be absorbed by collapsing of the projecting portion and hence, it is possible to protect the energy storage device.

The base plate may include a first base plate disposed on an end plate side of the projecting portion.

With such a configuration, the first base plate is disposed on the end plate side of the projecting portion and hence, an impact applied to the outer case is received by the projecting portion and then is transmitted to the first base plate. Accordingly, the transmission of the impact to the end plate side can be suppressed and hence, it is possible to protect the energy storage device. Further, for example, in the configuration where the spacer is fixed on the end plate side, the spacer can be easily fixed on the end plate side by mounting the first base plate on the end plate side.

The base plate may include a second base plate disposed on an outer case side of the projecting portion.

With such a configuration, the second base plate is disposed on the outer case side of the projecting portion and hence, an impact applied to the outer case is received by the second base plate and then is transmitted to the projecting portion. Accordingly, the transmission of the impact to the end plate side can be suppressed and hence, it is possible to protect the energy storage device. Further, for example, in the configuration where the spacer is fixed on the outer case side, the spacer can be easily fixed on the outer case side by mounting the second base plate on the outer case side.

The projecting portion may include a plurality of wall portions extending along a surface of the base plate.

With such a configuration, the projecting portion includes the plurality of wall portions and hence, an impact applied to the outer case can be further effectively absorbed by collapsing of the wall portions.

The plurality of wall portions may include a plurality of first wall portions, and a plurality of second wall portions extending between the plurality of first wall portions.

With such a configuration, the wall portions have the plurality of first wall portions and the plurality of second wall portions extending between the plurality of first wall portions. Accordingly, the plurality of first wall portions and the plurality of second wall portions are reinforced by each other. Accordingly, it is possible to suppress the occurrence of an unexpected damage on the wall portion due to vibration of the energy storage apparatus or the like.

The outer case may include a strip-shaped rib on a surface thereof which oppositely faces the spacer, and the spacer may have a recessed portion in which the rib is disposed.

With such a configuration, the rib of the outer case is disposed in the inside of the recessed portion formed on the spacer. Accordingly, the spacer can be disposed at a position relatively close to an inner surface of the outer case. The spacer having a large size can be disposed in a space between the end plate and the outer case. Accordingly, an impact applied to the outer case can be further effectively absorbed by the spacer and hence, it is possible to further securely protect the energy storage device.

The spacer may include an opening in which a fastening portion of the outer case with the end plate is disposed.

With such a configuration, the fastening portion of the outer case with the end plate is disposed in the inside of the opening formed in the spacer and hence, the fastening portion can be protected by the spacer. Accordingly, it is possible to suppress the occurrence of a damage or the like at the fastening portion to which a load is liable to be applied by fastening.

The spacer may be fixed to the outer case.

With such a configuration, the energy storage apparatus can be easily assembled by fixing the spacer to the outer case.

Hereinafter, the energy storage apparatus according to an embodiment of the present invention is described with reference to drawings. The embodiment described hereinafter is one preferred specific example of the present invention. In the embodiment described hereinafter, numerical values, shapes, materials, constitutional elements, the arrangement positions and connection states of the constitutional elements and the like are merely examples, and these are not intended to be used for limiting the present invention. Further, out of the constitutional elements in the embodiment described hereinafter, the constitutional elements which are not described in independent claims describing an uppermost concept are described as arbitrary constitutional elements. In the respective drawings, the respective constitutional elements are not described strictly accurately in size or the like.

In the description made hereinafter, there may be a case where an expression added with the term "approximately" such as "approximately parallel" is used. For example, "approximately parallel" means not only "completely parallel" but also "substantially parallel", that is, means that "approximately parallel" also includes the difference of approximately several % from "completely parallel", for example. The same goes also for other expressions with "approximately".

Embodiment

First, a configuration of an energy storage apparatus 1 is described.

Figure 2:
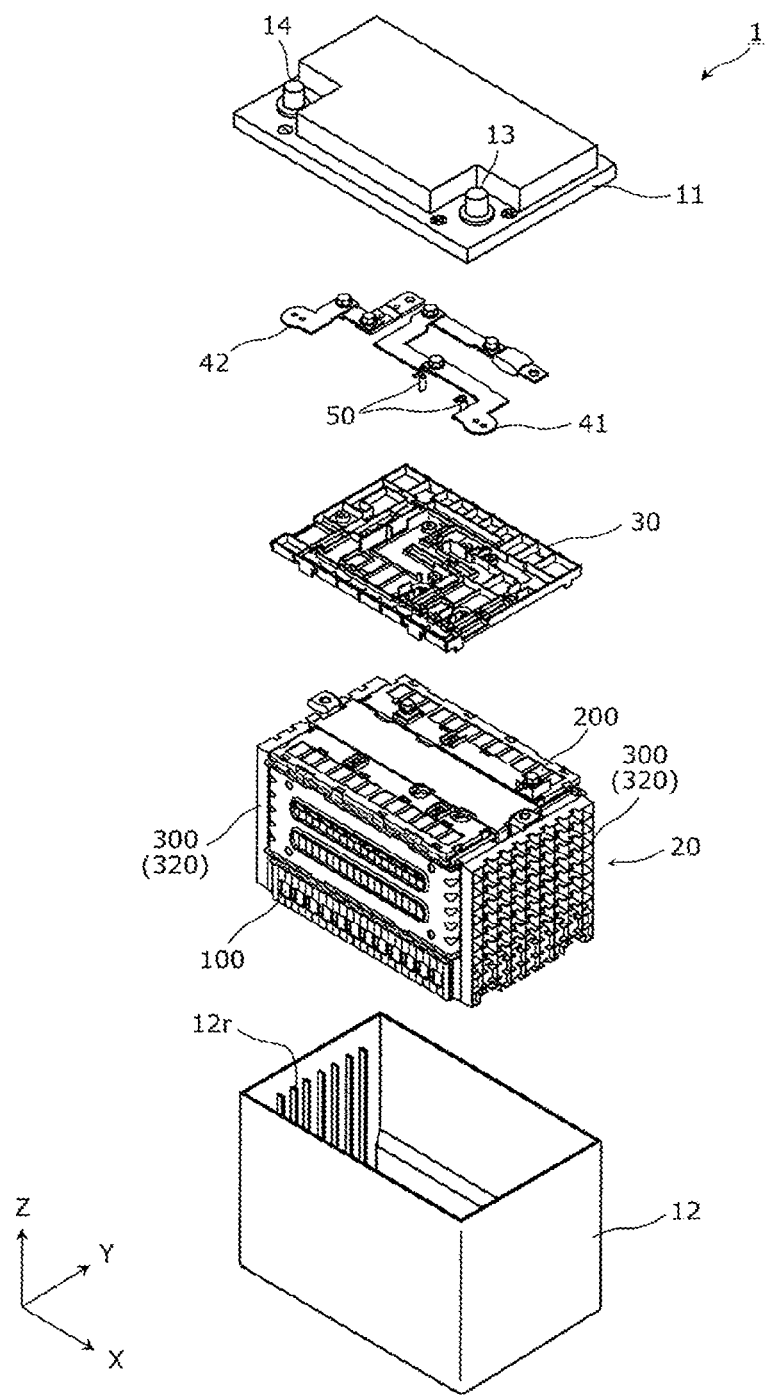
FIG. 2 is an exploded perspective view showing respective constitutional elements of the energy storage apparatus according to the embodiment in a disassembled state.

FIG. 1 is a perspective view showing an external appearance of the energy storage apparatus 1 according to an embodiment of the present invention. FIG. 2 is an exploded perspective view showing respective constitutional elements of the energy storage apparatus 1 according to the embodiment of the present invention in a disassembled state.

In these drawings, a Z axis direction is indicated as the vertical direction, and the description is made hereinafter using the Z axis direction as the vertical direction. However, there may be also a case where the Z axis direction is not the vertical direction depending on a mode of use and hence, the Z axis direction is not limited to the vertical direction. The same goes for drawings which are referenced hereinafter.

The energy storage apparatus 1 is an apparatus which can charge electricity from the outside of the energy storage apparatus 1 therein or can discharge electricity to the outside of the energy storage apparatus 1. For example, the energy storage apparatus 1 is a battery module used for power storage application, power source application or the like. As shown in FIG. 1 and FIG. 2, the energy storage apparatus 1 includes an outer case 10 formed of a first outer case 11 and a second outer case 12, and also includes an energy storage unit 20, a holder 30, bus bars 41, 42, thermistors 50 and the like which are accommodated in the inside of the outer case 10.

The outer case 10 is a container (module case) having a rectangular shape (box shape) which forms an outer case of the energy storage apparatus 1. The outer case 10 is disposed outside the energy storage unit 20, the holder 30, the bus bars 41, 42 and the thermistors 50, and allows the arrangement of the energy storage unit 20 and the like at predetermined positions thus protecting the energy storage unit 20 and the like from an impact or the like. For example, the outer case 10 is made of an insulating resin material such as polycarbonate (PC), polypropylene (PP), polyethylene (PE), a polyphenylene sulfide resin (PPS), polybutylene terephthalate (PBT) or an acrylonitrile butadiene styrene (ABS) resin. With such a configuration, the outer case 10 prevents the energy storage unit 20 and the like from coming into contact with a metal member or the like disposed outside the outer case 10.

In this embodiment, the outer case 10 includes: the first outer case 11 which forms a lid portion of the outer case 10; and the second outer case 12 which forms a body portion of the outer case 10. The first outer case 11 is a cover member having a flat rectangular shape which closes an opening of the second outer case 12. A positive electrode external terminal 13 and a negative electrode external terminal 14 are mounted on the first outer case 11. The energy storage apparatus 1 charges electricity from the outside therein through the positive electrode external terminal 13 and the negative electrode external terminal 14 or discharges electricity to the outside through the positive electrode external terminal 13 and the negative electrode external terminal 14. The second outer case 12 is a bottomed rectangular cylindrical housing having the opening, and houses the energy storage unit 20, the holder 30, the bus bars 41, 42, the thermistors 50 and the like therein.

In this embodiment, the outer case 10 has strip-shaped ribs 12r on a surface thereof which oppositely faces a spacer 300 (spacer 320) described later. To be more specific, the second outer case 12 has the ribs 12r. For example, the ribs 12r are elongated projecting portions extending in the Z axis direction, and a plurality of ribs 12r are arranged at predetermined intervals in a Y axis direction. Since the outer case 10 has the ribs 12r as described above, the resistance of the outer case 10 against deformation can be enhanced.

The first outer case 11 and the second outer case 12 may be made of the same material, or may be made of different materials.

Although electric equipment such as a printed circuit board and a relay are disposed in the inside of the first outer case 11, the illustration of such electric equipment is omitted. The first outer case 11 is configured to be separable into two members in the vertical direction (Z axis direction), and the electric equipment are arranged between two members. With such a configuration, it is possible to protect electric equipment from an impact or the like and, at the same time, it is possible to prevent the electric equipment from coming into contact with the external metal member and the like.

For example, a control circuit is mounted on the printed circuit board. The control circuit is connected to energy storage devices 100 in the inside of the energy storage unit 20 described later through wirings. The control unit acquires, monitors and controls various information such as a charge state, a discharge state, a voltage value, a current value, a temperature and the like of the energy storage device 100, performs an ON/OFF control of the relay, and performs the communication between the energy storage apparatus 1 and other equipment. In this embodiment, the above-mentioned temperature of the energy storage device 100 is a temperature acquired by using the thermistor 50. The control circuit is connected to the thermistor 50 mounted on the energy storage device 100 in a contact state through a wiring (lead wire), and acquires a temperature of the energy storage device 100 by converting information (resistance value) transmitted from the thermistor 50 into a temperature.

The energy storage unit 20 includes a plurality of energy storage devices 100 (twelve energy storage devices 100 in this embodiment) and a plurality of bus bars 200, and is electrically connected to the positive electrode external terminal 13 and the negative electrode external terminal 14 mounted on the first outer case 11. A positive electrode terminal of any one of the plurality of energy storage devices 100 is electrically connected to the positive electrode external terminal 13 through the bus bars 200. A negative electrode terminal of any one of the plurality of energy storage devices 100 is electrically connected to the negative electrode external terminal 14 through the bus bars 200.

The energy storage unit 20 is disposed in the inside of the second outer case 12 such that the plurality of energy storage devices 100 are arranged in a row in an X axis direction in a state where each energy storage device 100 is mounted vertically. The energy storage unit 20 is accommodated in the outer case 10 in a state where the energy storage unit 20 is covered by the first outer case 11 from above. The detailed description of the configuration of the energy storage unit 20 and the detailed description of the configuration for fixing the energy storage unit 20 and the outer case 10 to each other are made later.

The holder 30 is an electric component tray which can hold electric components such as the bus bars 41, 42, relays, wires (not shown in the drawing) and the like, can provide insulation between the bus bars 41, 42 and the like and other members, and can restrict the positions of the bus bars 41, 42 and the like. Particularly, the holder 30 performs the positioning of the bus bars 41, 42 with respect to the bus bars 200 in the inside of the energy storage unit 20, the positive electrode external terminal 13 and the negative electrode external terminal 14.

To be more specific, the holder 30 is mounted on an upper side (a plus side in the Z axis direction) of the energy storage unit 20 and is positioned with respect to the energy storage unit 20. The bus bars 41, 42 are mounted on the holder 30 and are positioned with respect to the holder 30. The first outer case 11 is disposed on the holder 30. With such a configuration, the bus bars 41, 42 are positioned with respect to the bus bars 200 disposed in the inside of the energy storage unit 20 and the positive electrode external terminal 13 and the negative electrode external terminal 14 mounted on the first outer case 11.

The holder 30 also has a function of holding the thermistors 50. Opening portions are formed in the holder 30. By inserting the thermistors 50 into the opening portions respectively and by rotating the thermistors 50, the thermistors 50 are positioned with respect to the energy storage devices 100, and are fixed in a state where the thermistors 50 are pressed to the energy storage devices 100.

The holder 30 is made of an insulating resin material such as PC, PP, PE, PPS, PBT or an ABS resin, for example. However, the holder 30 may be made of any material provided that the holder 30 is made of a material having insulating property.

The bus bars 41, 42 electrically connect the bus bars 200 disposed in the energy storage unit 20 and the positive electrode external terminal 13 and the negative electrode external terminal 14 mounted on the first outer case 11 to each other. The bus bar 41 is a conductive member which electrically connects the bus bar 200 disposed on one end in the energy storage unit 20 and the positive electrode external terminal 13 to each other. The bus bar 42 is an electrical conductive member which electrically connects the bus bar 200 disposed on the other end in the energy storage unit 20 and the negative electrode external terminal 14 to each other.

The bus bars 41, 42 are electrical conductive members and are made of copper, for example. However, materials for forming the bus bars 41, 42 are not particularly limited. The bus bars 41, 42 may be made of the same material or different materials.

The thermistors 50 are temperature sensors mounted on the energy storage devices 100. The thermistors 50 are mounted on the energy storage devices 100 in a state where the thermistors 50 are pressed to lid portions of the energy storage devices 100 respectively, and measure temperatures of the energy storage devices 100. In this embodiment, two thermistors 50 are disposed in two energy storage devices 100.

To be more specific, since the thermistors 50 are mounted on the holder 30 after the holder 30 is mounted on the energy storage devices 100, the thermistors 50 are disposed in a state where the thermistors 50 are positioned with respect to the energy storage devices 100 and are pressed to the energy storage devices 100. The principle that the thermistor 50 measures a temperature is substantially equal to the principle that a conventional thermistor measures a temperature and hence, the detailed description of the principle is omitted.

Next, the configuration of the energy storage unit 20 is described in detail.

Figure 3:
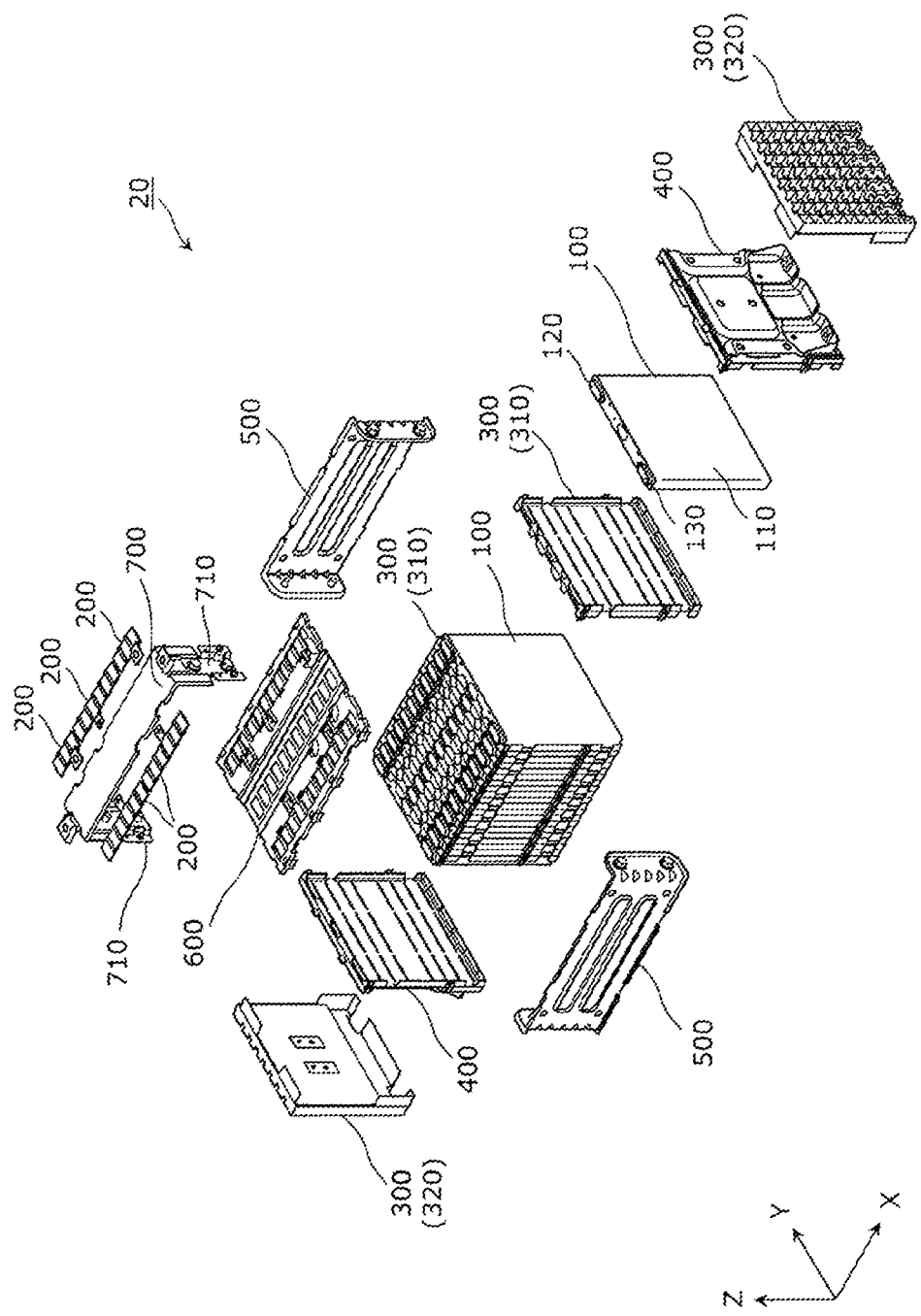
FIG. 3 is an exploded perspective view showing respective constitutional elements of an energy storage unit according to the embodiment in a disassembled state.

FIG. 3 is an exploded perspective view showing respective constitutional elements of the energy storage unit 20 according to the embodiment of the present invention in a disassembled state.

As shown in the drawing, the energy storage unit 20 includes: the plurality of energy storage devices 100; the plurality of bus bars 200; a plurality of spacers 300 (a plurality of spacers 310, and a pair of spacers 320); a pair of sandwiching members 400; a plurality of binding members 500; a bus bar frame 600; and a heat shielding plate 700.

The energy storage device 100 is a secondary battery (battery cell) which can charge or discharge electricity. To be more specific, the energy storage device 100 is a nonaqueous electrolyte secondary battery such as a lithium ion secondary battery. The energy storage device 100 has a flat rectangular shape, and is disposed adjacently to the spacer 310. The plurality of energy storage devices 100 and the plurality of spacers 310 are arranged in a row in the X axis direction such that the energy storage device 100 and the spacer 310 are alternately arranged. In this embodiment, twelve energy storage devices 100 and eleven spacers 310 are arranged such that the energy storage device 100 and the spacer 310 are arranged alternately and adjacently to each other. The energy storage device 100 is not limited to a nonaqueous electrolyte secondary battery, and may be a secondary battery other than a nonaqueous electrolyte secondary battery, or may be a capacitor. Further, the energy storage device 100 may be a primary battery which a user can use stored electricity without charging.

As shown in the drawing, the energy storage device 100 includes a container 110, a positive electrode terminal 120 and a negative electrode terminal 130. An electrode assembly (energy storage element), current collectors (a positive electrode current collector and a negative electrode current collector) and the like are disposed in the inside of the container 110, and a liquid such as an electrolyte solution (nonaqueous electrolyte) is sealed in the container 110. However, the detailed description of such a configuration is omitted.

The container 110 is formed of a bottomed container body made of metal and having a rectangular cylindrical shape; and a metal-made lid portion which closes an opening of the container body. The container 110 is configured such that the inside of the container 110 can be hermetically sealed by joining the lid portion and the container body to each other by welding or the like after the electrode assembly and the like are accommodated in the inside of the container 110. As described above, the container 110 is a rectangular parallelepiped container having a lid portion disposed on the plus side in the Z axis direction in the drawing, long side surfaces disposed on side surfaces of the container on both sides in the X axis direction, short side surfaces disposed on side surfaces of the container on both sides in the Y axis direction, and a bottom surface disposed on a minus side in the Z axis direction. Although a material for forming the container 110 is not particularly limited, it is preferable that the container 110 be made of weldable metal such as stainless steel, aluminum or an aluminum alloy, for example.

The positive electrode terminal 120 is an electrode terminal electrically connected to a positive electrode of the electrode assembly through the positive electrode current collector. The negative electrode terminal 130 is an electrode terminal electrically connected to a negative electrode of the electrode assembly through the negative electrode current collector. Both the positive electrode terminal 120 and the negative electrode terminal 130 are mounted on the lid portion of the container 110. The positive electrode terminal 120 and the negative electrode terminal 130 are metal-made electrode terminals through which electricity stored in the electrode assembly is discharged to a space outside the energy storage device 100, and through which electricity is introduced into a space inside the energy storage device 100 for storing electricity in the electrode assembly. In this embodiment, the energy storage devices 100 are disposed in a state where the positive electrode terminals 120 and the negative electrode terminals 130 are directed upward.

The bus bars 200 are bus bars electrically connected to the plurality of respective energy storage devices 100 in the energy storage unit 20. The bus bars 200 are conductive members electrically connected to the respective electrode terminals which the plurality of energy storage devices 100 have. The bus bars 200 electrically connect positive electrode terminals which the plurality of energy storage devices 100 have respectively to each other, and electrically connect negative electrode terminals which the plurality of energy storage devices 100 have respectively to each other. To be more specific, the bus bars 200 are disposed on surfaces of the respective electrode terminals which the plurality of respective energy storage devices 100 have, and are connected (joined) to the electrode terminals.

In this embodiment, five bus bars 200 are disposed, and twelve energy storage devices 100 are disposed such that four sets of energy storage devices 100 each of which is formed of three energy storage devices 100 connected parallel to each other are connected in series by five bus bars 200. The bus bars 200 disposed on end portions are connected to the bus bars 41, 42 described above so that the bus bars 200 are electrically connected to the positive electrode external terminal 13 and the negative electrode external terminal 14.

The bus bars 200 are electrical conductive members made of aluminum, for example. However, a material for forming the bus bars 200 is not particularly limited. All bus bars 200 may be made of the same material, or some bus bars 200 may be made of a material different from a material for forming other spacers.

The spacers 300 include the plurality of spacers 310 and the pair of spacers 320. The spacers 300 are made of an insulating resin such as PC, PP, PE, PPS, PBT or an ABS resin, for example. The spacers 310, 320 may be made of any material provided that the spacers 310, 320 are made of a material having insulating property. All of the spacers 310, 320 may be made of the same material, or some spacers 310, 320 may be made of a material different from a material for forming other spacers.

The spacer 310 is a plate-like member which is disposed on a side (a plus side or a minus side in the X axis direction) of the energy storage device 100, and provides insulation between the energy storage device 100 and other members. The spacer 310 is arranged between two energy storage devices 100 disposed adjacently to each other, and provides insulation between two energy storage devices 100. In this embodiment, eleven spacers 310 are arranged such that each spacer 310 is disposed between each two energy storage devices 100 of twelve energy storage devices 100.

The spacer 310 is formed such that the spacer 310 covers approximately half of a front surface side or a back surface side of the energy storage device 100 (an approximately half of the front surface side or the back surface side of the energy storage device 100 when the energy storage device 100 is divided in two in the X axis direction). Recessed portions are formed on both surfaces (both surfaces in the X axis direction) of the spacer 310 on the front surface side and the back surface side respectively, and an approximately half of the energy storage device 100 is inserted into the recessed portions. With such a configuration, the spacers 310 disposed on sides of the energy storage device 100 cover the most part of the energy storage device 100. Accordingly, insulating property can be enhanced between the energy storage device 100 and other conductive members by the spacers 310. Here, the spacer 310 is formed such that a portion of the energy storage device 100 at which the thermistor 50 is positioned is not covered by the spacer 310 thus allowing the thermistor 50 to come into contact with the energy storage device 100.

The spacer 320 is a plate-like member which is disposed between the sandwiching member 400 and the outer case 10, and provides insulation between the sandwiching member 400 and the outer case 10. To be more specific, the spacer 320 is disposed between the sandwiching member 400 and a side wall of the second outer case 12 (a body portion of the outer case 10). The spacer 320 is arranged at a position approximately parallel to the sandwiching member 400 and the side wall of the second outer case 12. In this specification, the side wall of the second outer case 12 is a wall positioned on a side of the energy storage device 100 out of the plurality of walls which constitute the second outer case 12. The side wall is a wall which forms a cylindrical body of the second outer case 12 having a bottomed rectangular cylindrical shape.

The spacer 320 also has a function as a buffer member which protects the energy storage unit 20 when an impact is applied to the outer case 10 from the outside or the like. The pair of spacers 320 is disposed between the pair of sandwiching members 400 and the outer case 10 such that the pair of spacers 320 sandwiches the pair of sandwiching members 400 from both sides. The pair of spacers 320 insulates the energy storage devices 100 and the like disposed in the energy storage unit 20, and also protects the energy storage devices 100 and the like from an impact from the outside. Two spacers 320 sandwich the energy storage devices 100 and are disposed between two sandwiching members 400 which are positioned so as to oppositely face each other and the outer case 10 respectively.

In this embodiment, these spacers 320 are fixed to spacer mounting portions 710 of the heat shielding plate 700 respectively. With such a configuration, the spacers 320 are accommodated in the outer case 10 in a state where the spacers 320 are fixed to the energy storage devices 100 respectively. The spacer 320 may not be mounted on the heat shielding plate 700. The spacer 320 may be mounted on the sandwiching member 400, or may be disposed between the sandwiching member 400 and the outer case 10 without being mounted on other members. The configuration of the spacer 320 and the configuration where the spacer 320 is fixed are described in detail later.

The sandwiching members 400 and the binding members 500 are members which press the energy storage devices 100 from the outside in the stacking direction of the electrode assembly of the energy storage device 100. The sandwiching members 400 and the binding members 500 sandwich the plurality of energy storage devices 100 from both sides in the stacking direction thus pressing each energy storage device 100 included in the plurality of energy storage devices 100 from both sides. The stacking direction of the electrode assembly of the energy storage devices 100 means the direction that positive electrodes, negative electrodes and separators of the electrode assembly are stacked, and is equal to the direction (X axis direction) that the plurality of energy storage devices 100 are arranged in a row. The plurality of energy storage devices 100 are arranged in a row in the stacking direction of the electrode assembly of the energy storage devices 100.

To be more specific, the sandwiching members 400 are flat plate-like members (end plates) disposed on both sides of the unit formed of the plurality of energy storage devices 100 in the X axis direction respectively. The sandwiching members 400 hold the plurality of energy storage devices 100 and the plurality of spacers 310 by sandwiching the plurality of energy storage devices 100 and the plurality of spacers 310 from both sides in the arrangement direction (X axis direction) of the plurality of energy storage devices 100 and the plurality of spacers 310. The sandwiching member 400 is made of a metal (conductive) material such as stainless steel or aluminum, for example, from a viewpoint of strength or the like of the sandwiching member 400. However, a material for forming the sandwiching member 400 is not limited to such a material, and may be made of an insulating material having high strength, for example.

The binding members 500 are elongated flat-plate-like members (binding bars) where both ends of each binding member 500 are mounted on the sandwiching members 400 thus allowing the binding members 500 to bind the plurality of energy storage devices 100. The binding members 500 are disposed so as to straddle over the plurality of energy storage devices 100 and the plurality of spacers 310, and apply a binding force to the plurality of energy storage devices 100 and the plurality of spacers 310 in the arrangement direction (X axis direction) of the plurality of energy storage devices 100 and the plurality of spacers 310.

In this embodiment, two binding members 500 are disposed on both sides (both sides in the Y axis direction) of the unit formed of the plurality of energy storage devices 100, and two binding members 500 bind the plurality of energy storage devices 100 by sandwiching the plurality of energy storage devices 100 from both sides. In the same manner as the sandwiching members 400, the binding members 500 are preferably made of a metal material such as stainless steel or aluminum, for example. However, the binding members 500 may be made of a material other than metal.

The bus bar frame 600 is a member which can provide insulation between the bus bars 200 and other members, and can regulate the positions of the bus bars 200. Particularly, the bus bar frame 600 performs the positioning of the bus bars 200 with respect to the plurality of energy storage devices 100 disposed in the energy storage unit 20.

To be more specific, the bus bar frame 600 is placed above (on the plus side in the Z axis direction of) the unit formed of the plurality of energy storage devices 100, and is positioned with respect to the plurality of energy storage devices 100. The bus bar frame 600 is made of an insulating resin material such as PC, PP, PE, PPS, PBT or an ABS resin, for example. However, the bus bar frame 600 may be made of any material provided that the bus bar frame 600 is made of a material having insulating property.

In the bus bar frame 600, two thermistor-use opening portions are formed. The thermistor-use opening portions are through holes into which two thermistors 50 are inserted respectively. Two thermistors 50 are respectively inserted into two thermistor-use opening portions, and are brought into contact with the lid portions of the containers 110 of the energy storage devices 100.

The heat shielding plate 700 is a plate-like member having heat insulating property which is disposed in the inside of a flow passage for a gas to be discharged through gas release valves of the energy storage devices 100. To be more specific, the heat shielding plate 700 is disposed above the bus bar frame 600 such that the heat shielding plate 700 is positioned above the gas release valves of the energy storage devices 100. When an abnormal state occurs such as a case where a gas is discharged from the gas release valve of the energy storage device 100, the heat shielding plate 700 protects electric equipment such as a printed circuit board disposed above the energy storage unit 20 from heat of the gas. In this embodiment, the heat shielding plate 700 is made of a metal material having low thermal conductivity such as stainless steel. However, a material for forming the heat shielding plate 700 is not limited to such a metal material, and it is sufficient that the heat shielding plate 700 be made of a material having high heat resistance and low thermal conductivity. For example, the heat shielding plate 700 may be made of a resin such as PPS or PBT reinforced with glass fibers, ceramic or the like.

In this embodiment, the heat shielding plate 700 has the spacer mounting portions 710 on both end portions in the longitudinal direction of the heat shielding plate 700, and two spacers 320 are mounted on the spacer mounting portions 710 respectively. The heat shielding plate 700 is not limited to the configuration where the heat shielding plate 700 has the spacer mounting portions 710, and may be configured to be positioned above the gas release valves of the energy storage devices 100, for example, may be a plate like member disposed above the bus bar frame 600.

Next, in the energy storage apparatus 1 having the above-mentioned configuration, the detailed configuration of the spacer 320 is described together with the configuration where the spacer 320 is fixed (that is, the configuration where the spacer 320 is mounted on the spacer mounting portion 710). Two spacers 320 have the same configuration and hence, hereinafter, the description is made with respect to matters relating to one spacer 320, and the description with respect to matters relating to the other spacer 320 is omitted.

Figure 4:
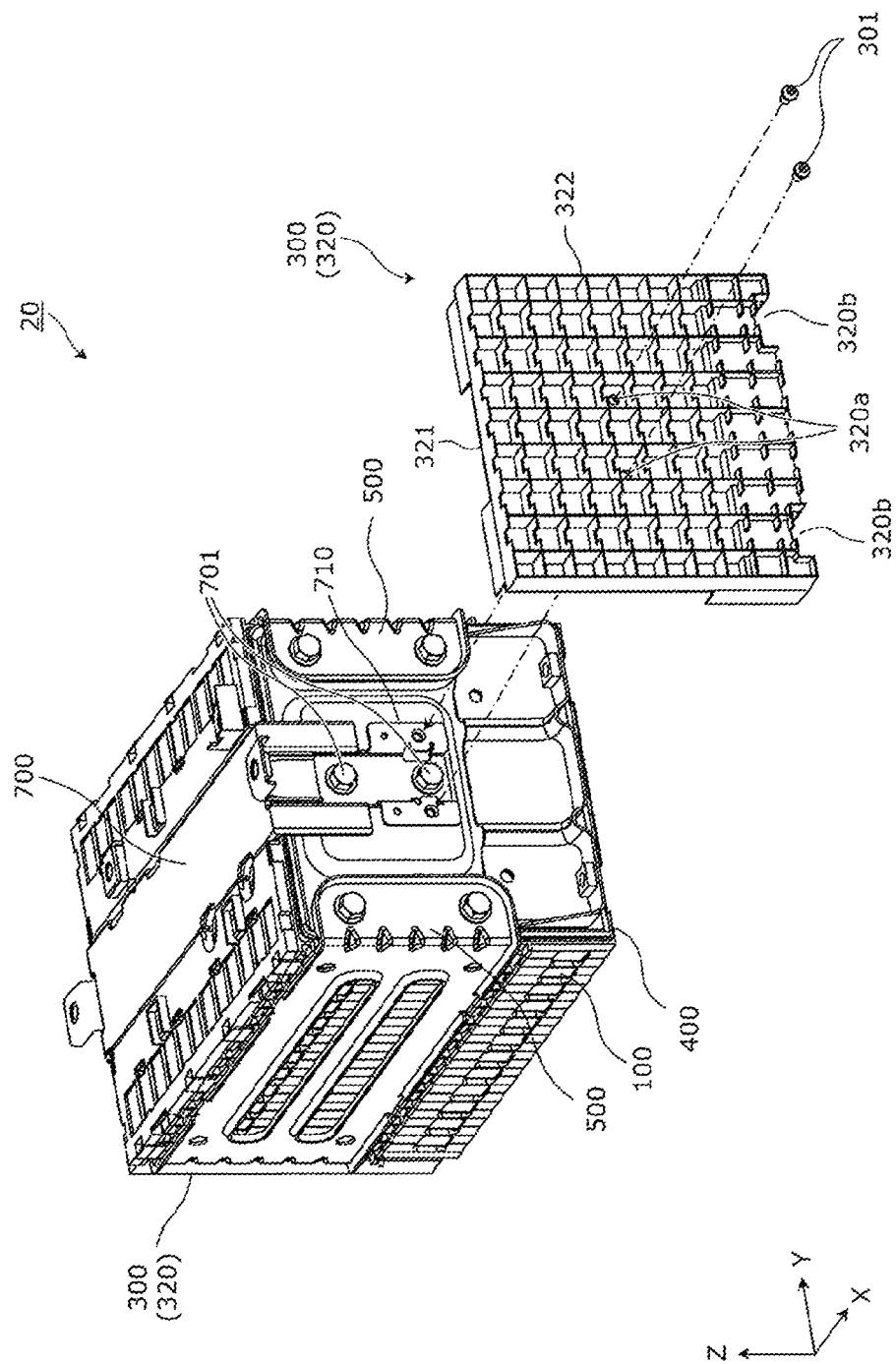
FIG. 4 is an exploded perspective view showing a state where a spacer is disassembled from the energy storage unit according to the embodiment.
Figure 5:
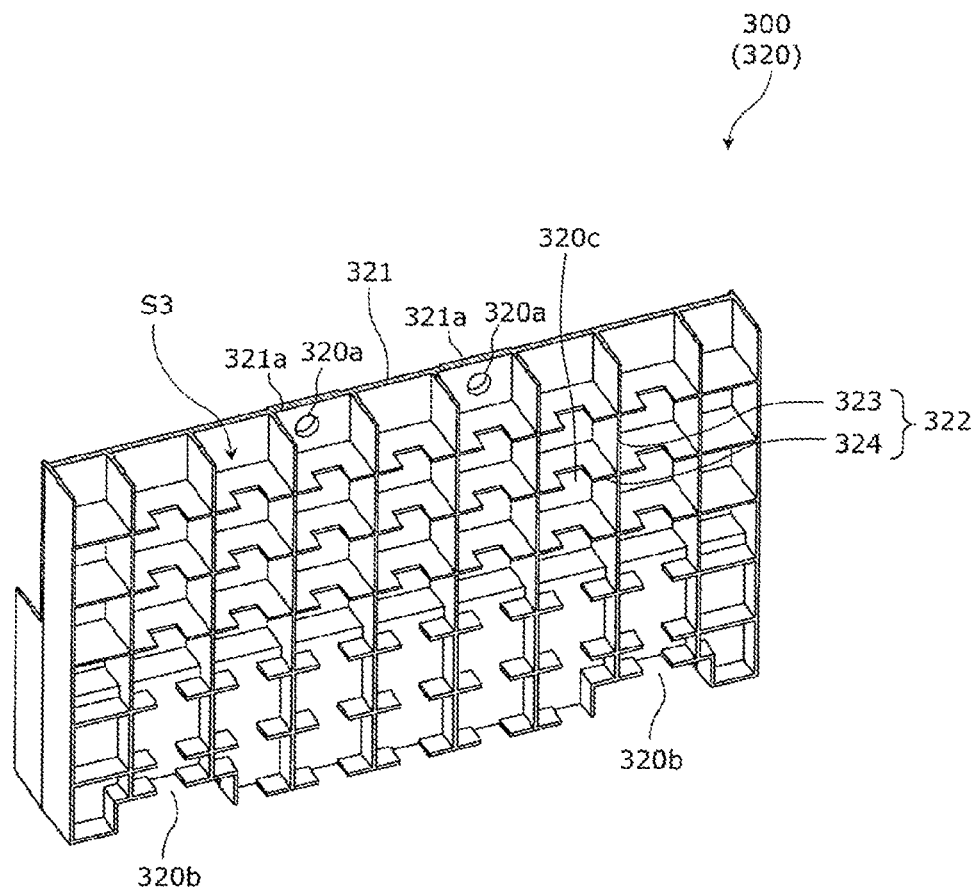
FIG. 5 is a perspective cross-sectional view showing a portion of the spacer according to the embodiment by cutting the spacer.
Figure 5:
Figure 6:
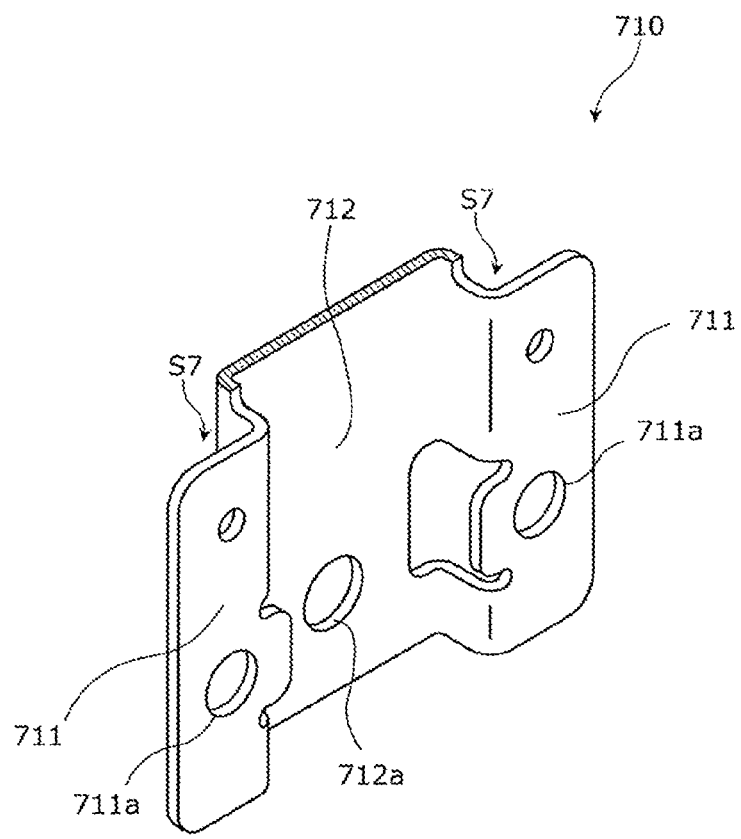
FIG. 6 is an enlarged perspective view showing a configuration of a spacer mounting portion of a heat shielding plate according to the embodiment in an enlarged manner.

FIG. 4 is an exploded perspective view showing a state where the spacer 320 is disassembled from the energy storage unit 20 according to the embodiment of the present invention. To be more specific, in FIG. 4, only one spacer 320 (the spacer 320 disposed on the plus side in the X axis direction) out of two spacers 320 is shown in a disassembled state from the energy storage unit 20. FIG. 5 is a perspective cross-sectional view showing a portion of the spacer 320 according to the embodiment of the present invention by cutting the spacer 320. FIG. 6 is an enlarged perspective view showing a configuration of the spacer mounting portion 710 of the heat shielding plate 700 according to the embodiment of the present invention in an enlarged manner.

In this embodiment, the spacer 320 shown in these drawings is formed so as to cover a surface of the sandwiching member 400 on a side opposite to the energy storage device 100. The spacer 320 is formed substantially equal to the sandwiching member 400 or slightly larger than the sandwiching member 400 in size as viewed from an arrangement direction of the spacer 320 and the sandwiching member 400 (as viewed in the X axis direction). With such a configuration, the spacer 320 is disposed between the sandwiching member 400 and a portion of the outer case 10 which oppositely faces the sandwiching member 400. Accordingly, the insulating property between sandwiching member 400 and the outer case 10 can be enhanced by the spacer 320, and a protection performance of protecting the energy storage devise 100 from an impact from the outside can be enhanced.

In this embodiment, openings 320b described later are formed in the spacer 320 to enable fixing of the sandwiching member 400 to the outer case 10.

As shown in FIG. 4 and FIG. 5, two through holes 320a into which two screws 301 are inserted (through which the screws 301 pass) are formed in the spacer 320. The spacer 320 is mounted on the spacer mounting portion 710 of the heat shielding plate 700 by screws 301 inserted into the through holes 320a and through holes 711a (see FIG. 6) formed in the spacer mounting portion 710. With such a configuration, the spacer 320 is positioned with respect to the energy storage device 100 in the inside of the outer case 10. A method of mounting the spacer 320 on the spacer mounting portion 710 is not particularly limited, and the spacer 320 may be mounted on the spacer mounting portion 710 by engaging, fitting or the like.

The spacer 320 has the openings 320b. A fastening portion of the outer case 10 with the sandwiching member 400 is disposed in the inside of the opening 320b. The fastening portion is inserted into and is disposed in the opening 320b. The fastening of the outer case 10 with the sandwiching member 400 in the inside of the opening 320b is described later.

The spacer 320 also has recessed portions 320c in which the ribs 12r of the outer case 10 are disposed. In a state where the energy storage unit 20 is accommodated in the outer case 10, the ribs 12r are disposed in the recessed portions 320c. The configuration where the ribs 12r are disposed in the recessed portions 320c is described later.

Further, the spacer 320 has rigidity which allows breaking or deformation of the spacer 320 when an impact is applied to the spacer 320 from a viewpoint of enhancing performance of protecting the energy storage devices 100 from an impact from the outside. When an impact is applied to the spacer 320, the spacer 320 is broken or deformed so that the impact is absorbed by the spacer 320 whereby the energy storage devices 100 are protected. For this end, in this embodiment, the spacer 320 has rigidity smaller than rigidity of the sandwiching member 400. For example, the rigidity of the spacer 320 and the rigidity of the sandwiching member 400 can be evaluated by using Computer Aided Engineering (CAE) analysis or the like where, for example, a shape of the spacer 320 and a shape of the sandwiching member 400 are prepared as three-dimensional (3D) models using a Computer Aided Design (CAD) or a shape of the spacer 320 and a shape of the sandwiching member 400 are read from actual products by 3D scanning.

To be more specific, in this embodiment, the spacer 320 includes: a base plate 321 which extends in an oppositely facing manner with the sandwiching member 400; and projecting portions 322 which project from the base plate 321.

The base plate 321 is a plate-like member having an approximately rectangular shape which extends in an oppositely facing manner with the sandwiching member 400. In this embodiment, the base plate 321 is disposed in an overlapping manner with the whole energy storage device 100 as viewed in a plan view of the base plate 321 (as viewed in the X axis direction). A shape of the base plate 321 is not limited to an approximately rectangular shape.

For example, the base plate 321 is formed with a wall thickness smaller than a wall thickness of the sandwiching member 400. Particularly, when the sandwiching member 400 is a laminated body formed of a resin-made end plate and a metal-made end plate, the base plate 321 is formed with a wall thickness smaller than a wall thickness of the resin-made end plate. In this manner, the base plate 321 is formed with a wall thickness smaller than a wall thickness of the resin-made end plate so that in the case where the base plate 321 and the resin-made end plate are made of the same material, rigidity of the base plate 321 becomes smaller than rigidity of the resin-made end plate. Accordingly, an impact applied to the outer case 10 can be absorbed by the base plate 321 due to collapsing of the base plate 321.

The above-mentioned through holes 320a are formed in the base plate 321. As shown in FIG. 5, peripheral portions 321a of the base plate 321 around the through hole 320a are formed with a wall thickness larger than a wall thickness of other portions of the base plate 321. In this manner, by forming the peripheral portions 321a with a large wall thickness, it is possible to suppress the occurrence of unexpected breaking or the like of the base plate 321 due to mounting of the spacer 320 using the screws 301. Breaking of the base plate 321 due to mounting of the spacer 320 can be suppressed while lowering rigidity of the portions of the base plate 321 other than the peripheral portions 321a for absorbing an impact.

The projecting portions 322 are portions projecting from the base plate 321, and are integrally formed with the base plate 321, for example. In this embodiment, the projecting portions 322 project from the base plate 321 toward a side opposite to the sandwiching member 400 (that is, toward outside of the energy storage apparatus 1). The base plate 321 is disposed on a sandwiching member 400 side of the projecting portions 322. A projecting direction of the projecting portions 322 is not particularly limited, and the projecting portions 322 may project toward the sandwiching member 400. However, by making the projecting portions 322 project toward a side opposite to the sandwiching member 400, the base plate 321 is positioned on a sandwiching member 400 side and hence, mounting operability of the spacer 320 can be enhanced.

To be more specific, as shown in FIG. 5, the projecting portion 322 has a plurality of first wall portions 323 extending along a surface (in the drawing, a surface on the plus side in the X axis direction) of the base plate 321, and a plurality of second wall portions 324 extending between the plurality of first wall portions 323. In this embodiment, the plurality of first wall portions 323 and the plurality of second wall portions 324 are arranged approximately orthogonal to each other. The arrangement of the first wall portions 323 and the second wall portions 324 is not limited to the substantially approximately orthogonal. Further, the first wall portions 323 and the second wall portions 324 may be arranged in a honeycomb form together with third wall portions (not shown in the drawing).

The plurality of first wall portions 323 are wall-shaped portions erected from the base plate 321. For example, the plurality of first wall portions 323 extend over the whole width of the base plate 321 in the Z axis direction, and are arranged at predetermined intervals in the Y axis direction. In this embodiment, the plurality of first wall portions 323 are arranged at intervals substantially equal to intervals of the ribs 12r of the outer case 10 such that one rib 12r is positioned between two first wall portions 323 disposed adjacently to each other in a state where the energy storage unit 20 is accommodated in the outer case 10.

The plurality of second wall portions 324 are wall-shaped portions erected from the base plate in the same manner as the first wall portions 323. For example, the plurality of second wall portions 324 extend over the whole width of the base plate 321 in the Y axis direction, and are arranged at predetermined intervals in the Z axis direction. In this embodiment, each second wall portion 324 has low-height portions where a recessed portion 320c in which the rib 12r is arranged is formed. Each low-height portion forms a cutout in the second wall portion 324. To be more specific, in the second wall portion 324, portions other than the recessed portions 320c are formed with substantially the same height as the first wall portions 323 (a width in the X axis direction), and portions corresponding to the recessed portions 320c are formed with a height lower than a height of the first wall portions 323.

The first wall portions 323 and the second wall portions 324 are formed with a wall thickness smaller than a wall thickness of the base plate 321 at connecting portions with the base plate 321, for example. Further, the first wall portions 323 and the second wall portions 324 are formed such that the wall thickness of the first wall portion 323 and the wall thickness of the second wall portion 324 are gradually decreased in the projecting direction. With such a configuration, the first wall portions 323 and the second wall portions 324 are collapsed more easily at an outer case 10 side and hence, the spacer 320 can further effectively absorb an impact applied to the outer case 10. Protection performance of the spacer 320 for protecting the energy storage devices 100 from an impact from the outside can be enhanced.

The first wall portions 323 and the second wall portions 324 may be made of the same material as the base plate 321, or may be made of a material different from a material for forming the base plate 321. The arrangement of the first wall portions 323 and the second wall portions 324 is not particularly limited. For example, the difference in density may be provided in the arrangement of the wall portions such that the wall portions are arranged more densely at the center portion of the base plate 321 than at the peripheral portion of the base plate 321. Further, arrangement intervals of the first wall portions 323 and arrangement intervals of the second wall portions 324 may be set equal to each other or may be set different from each other.

Due to the provision of these first wall portions 323 and second wall portions 324, a plurality of spaces S3 are formed in the inside of the spacer 320. Such spaces S3 in the inside of the spacer 320 act as spaces for absorbing an impact applied to the outer case 10 and hence, the protection performance of the spacer 320 for protecting the energy storage devices 100 from an impact from the outside can be enhanced.

Next, the configuration of the spacer mounting portion 710 is described in detail.

FIG. 6 is an enlarged perspective view showing the configuration of the spacer mounting portion 710 of the heat shielding plate 700 according to the embodiment of the present invention in an enlarged manner.

As shown in FIG. 4 and FIG. 6, the spacer mounting portion 710 includes first contact portions 711 which are brought into contact with the spacer 320, and a second contact portion 712 which is brought into contact with the sandwiching member 400. The spacer mounting portion 710 is fixed to the sandwiching member 400 by screws 701.

The first contact portions 711 are portions which are formed on both sides in the lateral direction of the heat shielding plate 700 (both sides in the Y axis direction), and project toward a side opposite to the sandwiching member 400 from the second contact portion 712. To be more specific, the pair of first contact portions 711 projects from both sides of the second contact portion 712 in the Y axis direction toward the spacer 320, and is brought into contact with the spacer 320 in a state where the pair of first contact portions 711 is bent along the spacer 320. A through hole 711a which is a through hole into which the screw 301 is inserted is formed in each first contact portion 711.

The second contact portion 712 is a portion arranged in a state where the second contact portion 712 is brought into contact with the sandwiching member 400. A through hole 712a into which the screw 701 is inserted is formed in the second contact portion 712.

Due to such a configuration of the spacer mounting portion 710, spaces S7 are formed between the sandwiching member 400 and the first contact portions 711. The sandwiching member 400 and the spacer 320 are arranged in a spaced-apart manner. Such spaces S7 formed between the sandwiching member 400 and the spacer 320 form spaces for absorbing an impact applied to the outer case 10 and hence, the protection performance of the spacer 320 for protecting the energy storage devices 100 from an impact from the outside can be further enhanced.

Due to the above-mentioned configuration, the spacer 320 is mounted on the spacer mounting portion 710. Further, the energy storage unit 20 is accommodated in the outer case 10 in a state where the spacers 320 are mounted on the energy storage unit 20, and is fixed to the outer case 10 as described hereinafter.

Figure 7:
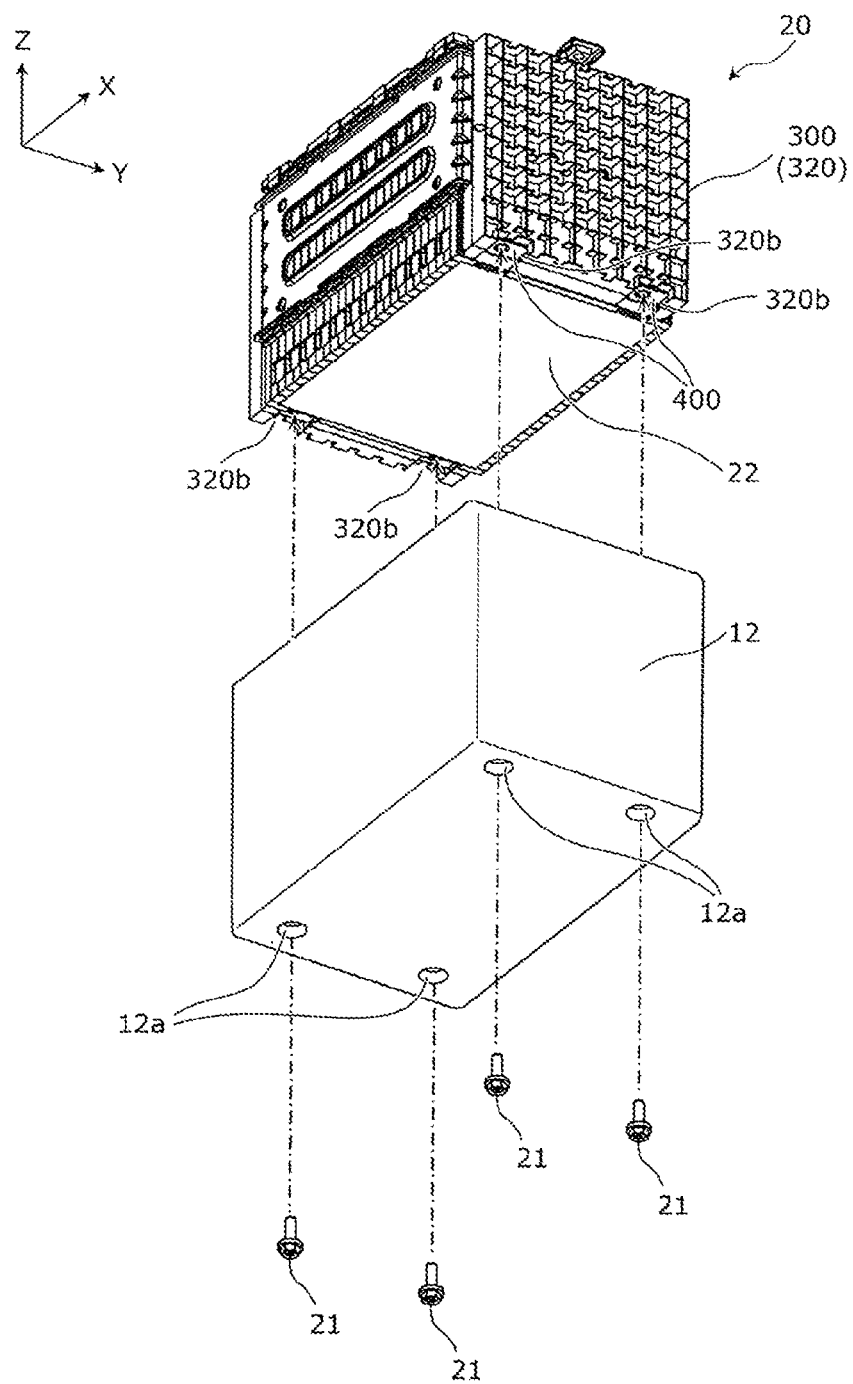
FIG. 7 is a perspective view showing a state where the energy storage unit according to the embodiment and an outer case are fixed to each other.

FIG. 7 is a perspective view showing a state where the energy storage unit 20 according to the embodiment of the present invention and the outer case 10 (second outer case 12) are fixed to each other.

As shown in the drawing, the second outer case 12 has mounting portions 12a for fastening tools 21. Mounting portions 12a are recessed portions recessed toward the sandwiching members 400, and the sandwiching members 400 are fixed to the mounting portions 12a. With such a configuration, the energy storage unit 20 is fixed to the outer case 10 in a state where the energy storage unit 20 is accommodated in the second outer case 12.

To be more specific, a through hole (not shown in the drawing) in which the fastening tool 21 is inserted is formed in each mounting portion 12a. The mounting portions 12a constitute fastening portions of the outer case 10 to be fastened with the sandwiching member 400.

The fastening tools 21 are bolts for fixing the sandwiching member 400 to the outer case 10 (in this embodiment, the second outer case 12), for example. The fastening tools 21 is not limited to bolts, and may be screws or the like.

Due to such fixing (fastening) by the fastening tools 21, the energy storage unit 20 is fixed to the outer case 10. As shown in the drawing, the energy storage unit 20 is fixed to the outer case 10 also by an adhesive material 22 disposed between the energy storage device 100 and the outer case 10. The adhesive material 22 is a double-coated adhesive tape for fixing the energy storage devices 100 disposed in the inside of the energy storage unit 20 to the outer case 10 at a position different from positions where the fastening tools 21 are disposed, for example. The adhesive material 22 is not limited to a double-coated adhesive tape, and may be an adhesive agent. Alternatively, the adhesive material 22 may be an adhesive material having the surface fastener structure which allows the adhesion in a detachable manner referred to as Magic Tape (registered trademark) or Velcro tape (registered trademark).

The mounting portions 12a (fastening portions) of the outer case 10 are disposed in the inside of the openings 320b of the spacer 320. The mounting portions 12a are fixed (fastened) to the sandwiching members 400 exposed from the openings 320b using fastening tools 21.

Hereinafter, the configuration of the energy storage unit 20 accommodated in the outer case 10 as described above is described in detail.

Figure 8:
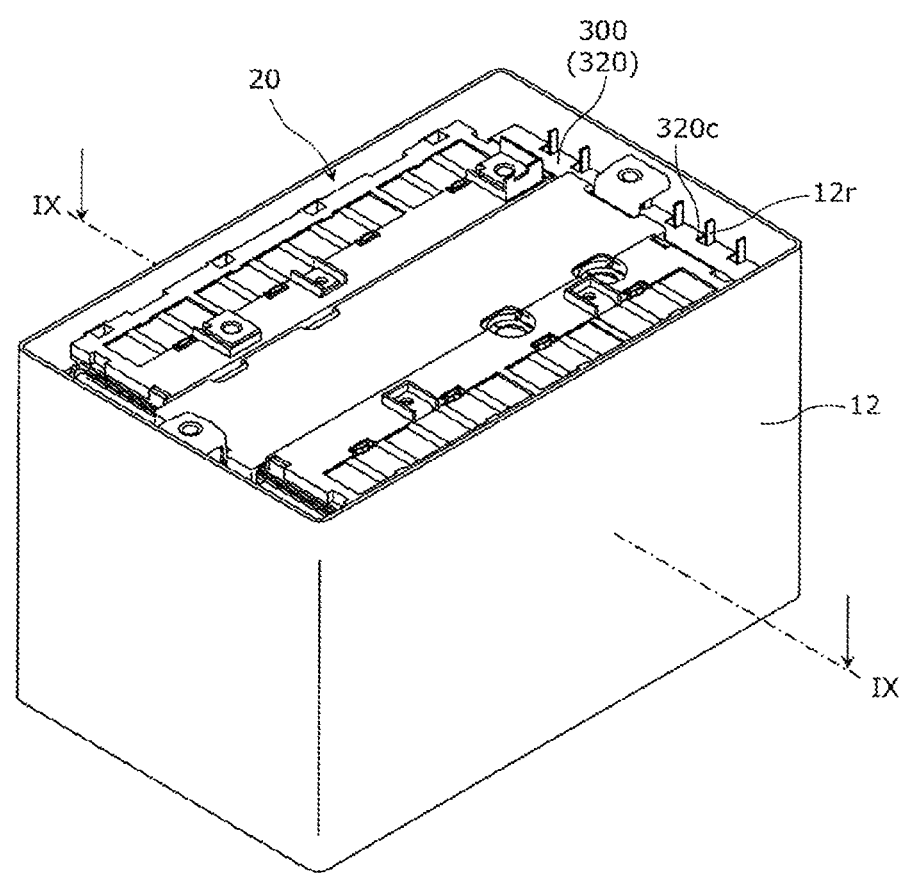
FIG. 8 is a perspective view showing a configuration where the energy storage unit according to the embodiment is accommodated in the outer case.
Figure 9:
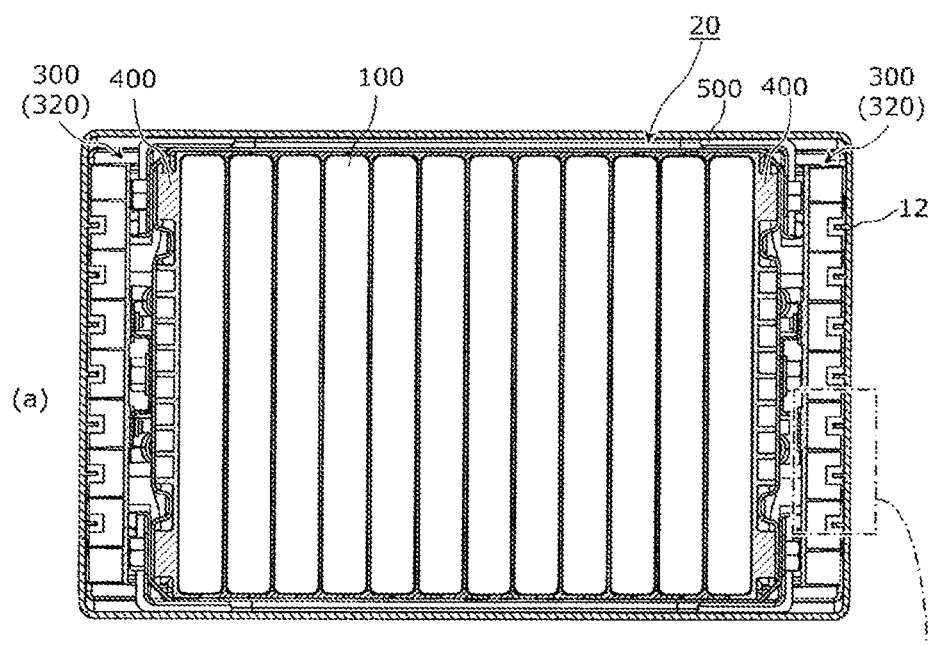
FIG. 9 is a cross-sectional view showing a configuration where the energy storage unit according to the embodiment is accommodated in the outer case.
Figure 9:
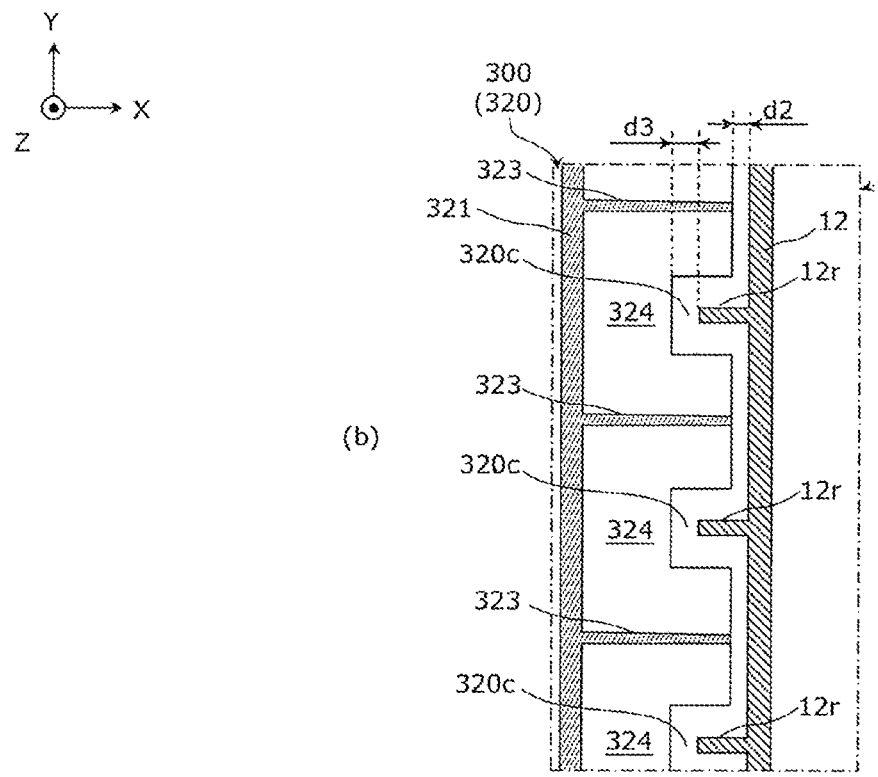

FIG. 8 is a perspective view showing a configuration of the energy storage unit 20 according to the embodiment of the present invention in a state where the energy storage unit 20 is accommodated in the outer case 10 (second outer case 12). FIG. 9 is a cross-sectional view showing a configuration of the energy storage unit 20 according to the embodiment of the present invention in a state where the energy storage unit 20 is accommodated in the outer case 10 (second outer case 12). To be more specific, (a) of FIG. 9 is a whole cross-sectional view of the energy storage unit 20 taken along line IX-IX in FIG. 8 which is a perspective view, and (b) of FIG. 9 is a view showing a region surrounded by a chained line in (a) of FIG. 9 in an enlarged manner. In these drawings, with respect to members which form the energy storage apparatus 1, the illustration of members other than the second outer case 12 and the energy storage unit 20 is omitted.

As shown in these drawings, in a state where the energy storage unit 20 is accommodated in the outer case 10 (second outer case 12), the ribs 12r are disposed in the recessed portions 320c. To be more specific, as shown in (b) of FIG. 9, each recessed portion 320c has a shape where the recessed portion 320c is recessed toward a projecting direction of the rib 12r with a size slightly larger than a profile of the rib 12r such that the rib 12r is positioned in the inside of the recessed portion 320c. In a state where the energy storage unit 20 is accommodated in the inside of the second outer case 12, the spacer 320 and the second outer case 12 are disposed in a slightly spaced apart manner from each other.

Here, assuming a distance between the spacer 320 and an inner surface of the second outer case 12 as d2, and a distance between a bottom portion of the recessed portion 320c (that is, a low-height portion of the second wall portion 324) and the rib 12r as d3, the relationship of d2<d3 is established. The second outer case 12 and the spacer 320 are disposed such that a gap formed between the second outer case 12 and the spacer 320 is set small at other positions compared to the positions where the ribs 12r are formed.

As described above, deformation resistance of the second outer case 12 is enhanced by the ribs 12r and hence, even when an impact is applied to the second outer case 12, provided that the ribs 12r are not damaged, the deformation of the second outer case 12 is suppressed. On the other hand, when a larger impact is applied to the second outer case 12 so that the second outer case 12 is deformed toward the inside of the energy storage apparatus 1, the second outer case 12 is firstly brought into contact with the spacer 320 at the portions different from the portions where the ribs 12r are formed. Accordingly, the second outer case 12 is brought into contact with the spacer 320 with a relatively large area and hence, the concentration of a stress to a specific portion of the spacer 320 due to applying of the impact can be suppressed. Accordingly, protection performance of the spacer 320 from an impact from the outside can be enhanced.

As has been described heretofore, according to the energy storage apparatus 1 of this embodiment, the plate-like spacer 320 is disposed between the end plate (in this embodiment, the sandwiching member 400) and the outer case 10. Accordingly, an impact applied to the outer case 10 can be absorbed by breaking or deformation of the spacer 320. For example, when rigidity of the spacer 320 is lower than rigidity of the sandwiching member 400, breaking or deformation of the sandwiching member 400 can be suppressed by breaking or deformation of the spacer 320 per se. Accordingly, an impact applied to the energy storage device 100 through the sandwiching member 400 can be suppressed. As a result, it is possible to protect the energy storage device 100 from the impact.

According to this embodiment, the spacer 320 is disposed between the sandwiching member 400 and the body portion (in this embodiment, the second outer case 12) of the outer case 10 and hence, it is possible to protect the energy storage device 100 from an impact applied to the body portion. Such a configuration is particularly useful in an in-use state where the lid portion (in this embodiment, the first outer case 11) is disposed on an upper side in a vertical direction. In an in-use state where the first outer case 11 is disposed on an upper side in a vertical direction, the number of cases where an impact is applied to the second outer case 12 is larger than the number of cases where an impact is applied to the first outer case 11. Accordingly, by disposing the spacer 320 between the sandwiching member 400 and the second outer case 12, it is possible to effectively protect the energy storage device 100 from an impact.

According to this embodiment, the spacer 320 is disposed at the position which is substantially parallel to the sandwiching member 400 and hence, the sandwiching member 400 can receive an impact applied to the outer case 10 by a face by way of the spacer 320. Accordingly, it is possible to protect the energy storage device 100.

According to this embodiment, two spacers 320 sandwich the energy storage devices 100 and hence, it is possible to protect the energy storage devices 100 more securely.

According to this embodiment, the spacer 320 includes the projecting portions 322 projecting from the base plate 321 and hence, a load generated by an impact applied to the outer case 10 is likely to be larger at the projecting portions 322 than at the base plate 321. Accordingly, the impact applied to the outer case 10 can be absorbed by collapsing of the projecting portions 322 and hence, it is possible to protect the energy storage device 100.

According to this embodiment, the base plate 321 is disposed on the sandwiching member 400 side of the projecting portion 322 and hence, an impact applied to the outer case 10 is received by the projecting portion 322 and then is transmitted to the base plate 321. Accordingly, the transmission of the impact to the sandwiching member 400 side can be suppressed and hence, it is possible to protect the energy storage device 100. Further, in the configuration where the spacer 320 is fixed to the energy storage device 100, by disposing the base plate 321 on the sandwiching member 400 side, the spacer 320 can be easily fixed to the energy storage device 100.

According to this embodiment, the projecting portion 322 includes the plurality of first wall portions 323 and the plurality of second wall portions 324 extending between the plurality of first wall portions 323. Accordingly, the plurality of first wall portions 323 and the plurality of second wall portions 324 are reinforced by each other. Accordingly, it is possible to suppress the occurrence of an unexpected damage on the projecting portion 322 due to vibration or the like of the energy storage apparatus 1.

According to this embodiment, the ribs 12r of the outer case 10 are disposed in the inside of the recessed portions 320c formed on the spacer 320. Accordingly, the spacer 320 can be disposed at a position relatively close to an inner surface of the outer case 10. The spacer 320 having a large size can be disposed in a space between the sandwiching member 400 and the outer case 10. Accordingly, an impact applied to the outer case 10 can be further effectively absorbed by the spacer 320 and hence, it is possible to further securely protect the energy storage device 100.

According to this embodiment, the fastening portions (in this embodiment, the mounting portions 12a) of the outer case 10 are disposed in the inside of the openings 320b of the spacer 320 and hence, the fastening portions can be protected by the spacer 320. Accordingly, it is possible to suppress the occurrence of a damage or the like at the fastening portions to which a load is liable to be applied by fastening.

(Modification 1)

Next, a modification 1 of the above-mentioned embodiment is described. In the above-mentioned embodiment, the energy storage apparatus 1 includes the sandwiching members 400, and the spacers 320 are disposed between the sandwiching members 400 and the outer case 10 respectively. However, the energy storage apparatus may not include the sandwiching members, and the spacer may be disposed between the energy storage devices 100 at end portions among one or more energy storage devices 100 and the outer case 10 respectively. Hereinafter, in this modification, the energy storage apparatus having such a configuration is described.

Figure 10:
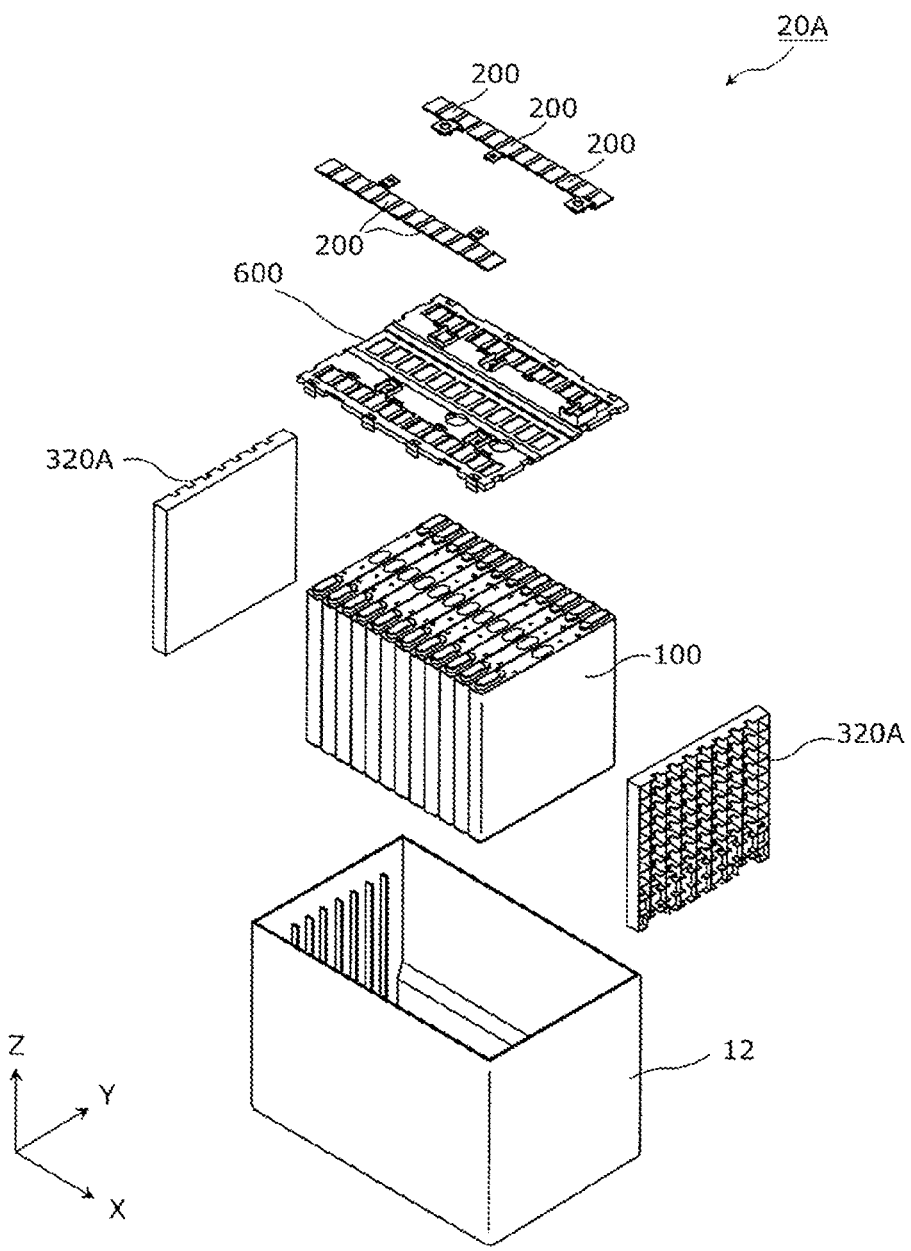
FIG. 10 is an exploded perspective view showing respective constitutional elements of an energy storage unit according to a modification 1 of the embodiment in a disassembled state.

FIG. 10 is an exploded perspective view showing respective constitutional elements when an energy storage unit 20A according to the modification 1 of the embodiment is disassembled. In FIG. 10, a second outer case 12 of an outer case 10 is also shown. In FIG. 10, the illustration of spacers each of which is disposed between energy storage devices 100 which are disposed adjacently to each other, a heat shielding plate of the energy storage unit 20A and the like are omitted.

The energy storage unit 20A shown in FIG. 10 includes neither sandwiching members 400 nor binding members 500 compared to the energy storage unit 20 of the embodiment. Accordingly, a plurality of energy storage devices 100 are accommodated in the outer case 10 in a state where the plurality of energy storage devices 100 are not bound to each other. A wall or the like for holding the energy storage devices 100 may be disposed in the inside of the second outer case 12.

In the energy storage apparatus having the above-mentioned configuration, spacers 320A are disposed between the energy storage devices 100 at end portions among one or more energy storage devices 100 (in this modification, twelve energy storage devices 100) and the outer case 10 (in this modification, the second outer case 12) respectively. To be more specific, in this modification, the pair of spacers 320A is disposed between the energy storage devices 100 at both end portions and the outer case 10 so as to sandwich the plurality of energy storage devices 100 from both sides of a unit formed of the plurality of energy storage devices 100. Accordingly, the energy storage devices 100 and the like in the energy storage unit 20 can be insulated, and can be protected from an impact from the outside.

According to the energy storage apparatus of this modification having the above-mentioned configuration, an advantageous effect substantially equal to the advantageous effect acquired by the above-mentioned embodiment can be acquired. The spacers 320A are disposed between the energy storage devices 100 disposed at the end portions and the outer case 10 and hence, an impact applied to the outer case 10 can be absorbed by collapsing of the spacers 320A. Accordingly, it is possible to protect the energy storage device 100 from the impact.

(Modification 2)

Figure 11:
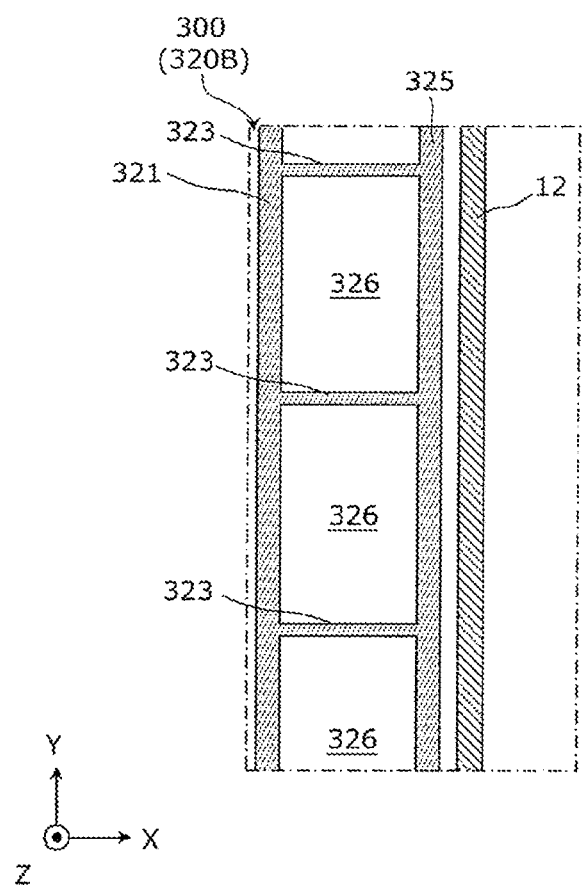
FIG. 11 is a cross-sectional view showing a configuration of a spacer according to a modification 2 of the embodiment.

Next, a modification 2 of the above-mentioned embodiment is described. In the above-mentioned embodiment, the spacer 320 includes the base plate 321 only on one side of the projecting portions 322. However, in this modification, a spacer includes a base plate on both sides of projecting portions. FIG. 11 is a cross-sectional view showing a configuration of a spacer 320B according to the modification 2 of the embodiment. To be more specific, FIG. 11 is a drawing which corresponds to (b) of FIG. 9.

As shown in FIG. 11, while a spacer 320B includes a base plate in the same manner as the above-mentioned embodiment, the spacer 320B includes, as the base plate, a base plate 325 in addition to a base plate 321 which is substantially equal to the base plate of the above-mentioned embodiment. Hereinafter, the base plate 321 is referred to as a first base plate 321, and the base plate 325 is referred to as a second base plate 325.

The first base plate 321 is a base plate which is disposed on a sandwiching member 400 side of projecting portions 322 (first wall portions 323 and second wall portions 326). The second base plate 325 is a base plate which is disposed on an outer case 10 side (a side wall side of the second outer case 12) of the projecting portions 322 (the first wall portions 323 and the second wall portions 326).

To be more specific, the second base plate 325 is disposed so as to oppositely face a side wall of the second outer case 12. Accordingly, ribs 12r are not formed on the side wall of the second outer case 12 which oppositely faces the second base plate 325, and recessed portions 320c are not formed on the second wall portion 326 which the projecting portion 322 includes unlike the second wall portion 324 of the above-mentioned embodiment. The first wall portion 323 which the projecting portions 322 include has substantially the same configuration as the first wall portion 323 of the above-mentioned embodiment.

The energy storage apparatus according to this modification having the above-mentioned configuration can acquire an advantageous effect substantially equal to the advantageous effect of the above-mentioned embodiment. Particularly, the spacer 320B includes the base plate on both sides of the projecting portions 322 and hence, the spacer 320B can absorb an impact applied to the outer case 10 further effectively thus protecting the energy storage device 100. Further, for example, in the configuration where the spacer 320B is fixed to the outer case 10, the spacer 320B can be easily fixed to the outer case 10 by mounting the second base plate 325 on the outer case 10.

(Another Modification)

Although the energy storage apparatus according to the embodiment of the present invention and the modifications of the embodiment have been described heretofore, the present invention is not limited to the above-mentioned embodiment and the modifications of the embodiment. It should be construed that the embodiment and the modifications of the embodiment disclosed in this specification are only for an exemplifying purpose in all aspects and are not limited. The scope of the present invention is not designated by the above-mentioned description but is designated by Claims, and it is intended that all modifications which fall within the meaning and the scope equivalent to Claims are also included in the scope of the present invention. Further, the configurations which are made by arbitrarily combining the respective constitutional elements which the above-mentioned embodiment and the modifications of the embodiment include are also included in the scope of the present invention.

For example, in the above-mentioned embodiment and the modification 2, the spacers 320, 320B are fixed to the energy storage device 100. In the above-mentioned modification 1, the spacer 320A is not fixed to the energy storage device 100 or the like. However, these spacers may be fixed to the outer case 10. As a method of fixing the spacer, various methods such as a double-coated adhesive tape, an adhesive agent, a thermal welding, a screwing and the like are considered. In this manner, by fixing the spacer to the outer case 10, it is possible to suppress the occurrence of a phenomenon that the spacer is displaced from the outer case 10 due to an impact or the like from the outside. Also in manufacturing the energy storage apparatus 1, the energy storage apparatus 1 can be easily assembled.

In the above-mentioned embodiment, the energy storage device is configured to include the pair of sandwiching members 400. However, the number of sandwiching members 400 is not particularly limited, and one, or three or more sandwiching members 400 may be provided, for example. When one sandwiching member is provided, the sandwiching member 400 may be configured to sandwich the energy storage devices 100 in cooperation with an inner wall of the outer case 10 which oppositely faces the sandwiching member 400 with the energy storage devices 100 sandwiched therebetween. Further, the sandwiching member 400 may not sandwich the energy storage devices 100, and the sandwiching member 400 may be an end plate disposed on a side of the energy storage device 100.

In the above-mentioned embodiment and the modifications of the embodiment, the energy storage apparatus includes the plurality of energy storage devices 100. However, the number of energy storage devices 100 is not particularly limited provided that at least one or more energy storage devices are provided.

In the above-mentioned embodiment and the modification 1 of the embodiment, the spacers 320, 320A are disposed between the energy storage devices 100 at the end portion among one or more energy storage devices 100 and the side walls of the body portion of the outer case 10 (in the above-mentioned description, the second outer case 12). However, the arrangement positions of the spacers 320, 320A are not limited to such positions. When one or more energy storage devices 100 are arranged in a row in the vertical direction, the spacers 320, 320A may be disposed between the energy storage device 100 at an end portion and a lid portion (in the above-mentioned description, the first outer case 11) of the outer case 10 and between the energy storage device 100 at an end portion and a lower wall of the body portion of the outer case. The same goes also for the modification 2.

A size of the spacer 320, 320A is not particularly limited provided that the spacer 320, 320A has a plate-like shape. However, from a viewpoint of protecting the energy storage device 100 by absorbing an impact, it is preferable to form the spacer 320, 320A as follows, for example. To be more specific, when the spacer 320, 320A and the energy storage device 100 are viewed in an arrangement direction of the spacer 320, 320A and the energy storage device 100, it is preferable to form the spacer 320, 320A such that the spacer 320, 320A covers the most part of the energy storage device 100 and, further, it is preferable that the spacer 320, 320A cover the electrode assembly in the energy storage device 100. As viewed in the arrangement direction, it is preferable to set a maximum width and a maximum height of the spacer 320, 320A larger than a maximum width and a maximum height of the energy storage device 100. The same goes also for the modification 2.

It is sufficient for the spacer 320, 320A to have a plate-like shape in a schematic view. The spacer 320, 320A may have a projecting portion, a recessed portion or the like in shapes of details. The same goes also for the modification 2.

A material for forming the spacer 320, 320A is not limited to a material having insulating property. For example, provided that insulation between the outer case 10 and other members such as the energy storage device 100 can be sufficiently ensured, the spacer 320, 320A may be made of a material having conductivity. The same goes also for the modification 2.

In the above-mentioned embodiment and the modification 1, the spacer 320, 320A includes the base plate 321 and the projecting portions 322 which project from the base plate 321. However, the spacer 320, 320A is not limited to such a configuration. It is sufficient that the spacer 320, 320A be configured to protect the energy storage device 100 from an impact. For example, it is sufficient for the spacer 320 to have rigidity lower than rigidity of the sandwiching member 400. The spacer 320, 320A may be made of a porous and flexible raw material, or may be made of a resin or a raw material having elasticity such as rubber. The same goes also for the modification 2.

In the above-mentioned embodiment and the modification 1, the projecting portions 322 include the plurality of first wall portions 323 and the plurality of second wall portions 324. However, the number of first wall portions 323 and the number of second wall portions 324 are not limited to such numbers. The projecting portions 322 may include one first wall portion 323 and one second wall portion 324, for example. The second wall portions 324 are configured to extend between the plurality of first wall portions 323 in the above-mentioned embodiment and the modification 1. However, the second wall portions 324 may be configured to extend between some of the first wall portions 323, or may be configured to extend only between each two first wall portions 323 disposed adjacently to each other. Further, it is sufficient that the projecting portions 322 project from the base plate 321, and the projecting portion 322 may not include at least either one of the first wall portions 323 or the second wall portions 324. A shape of the projecting portion 322 is not limited to a wall shape, and may be a columnar shape. The same goes also for the modification 2.

In the above-mentioned embodiment and the modification 1 of the embodiment, the projecting portions 322 include the plurality of first wall portions 323, and the plurality of second wall portions 324 extending between the plurality of first wall portions 323. However, it is sufficient that the projecting portions 322 have a plurality of wall portions extending along a surface of the base plate 321. For example, the projecting portions 322 may include either one of the plurality of first wall portions 323 or the plurality of second wall portions 324 and may not include the other of the plurality of first wall portions 323 and the plurality of second wall portions 324. Also with such a configuration, the projecting portions 322 have the plurality of wall portions and hence, an impact applied to the outer case 10 can be further effectively absorbed by collapsing of the wall portions. The extending direction of the plurality of wall portions is not particularly limited. The extending direction of the plurality of wall portions may be equal to the extending direction of the first wall portions 323 or the extending direction of the second wall portions 324, or may be other directions. The same goes also for the modification 2.

In the above-mentioned embodiment and the modification 1 of the embodiment, the outer case 10 has the ribs 12r on the surface thereof which oppositely faces the spacer 320, 320A. However, the outer case 10 may not have the ribs 12r so that the surface of the outer case 10 may be formed into a flat shape, for example. In such a case, the spacer 320, 320A may not include the recessed portions 320c. Further, even when the outer case 10 has the ribs 12r, the spacer 320, 320A may be configured such that the spacer 320, 320A does not include the recessed portions 320c. For example, the whole spacer 320, 320A is formed with a small thickness which corresponds to a thickness of the rib 12r.

Further, in the above-mentioned embodiment and the modification 1 of the embodiment, the spacer 320, 320A includes the openings 320b in which the fastening portions of the outer case 10 with the sandwiching members 400 are disposed respectively. However, the spacer 320, 320A may not include the openings 320b. For example, the space 320, 320A may be configured such that an area of the spacer 320, 320A is decreased in the vertical direction so as to avoid the fastening portions. The same goes also for the modification 2.

INDUSTRIAL APPLICABILITY

The present invention is applicable to an energy storage apparatus which includes one or more energy storage devices and an outer case and the like.

DESCRIPTION OF REFERENCE SIGNS

1: energy storage apparatus
10: outer case
11: first outer case
12: second outer case
12a: mounting portion 12r: rib
13: positive electrode external terminal
14: negative electrode external terminal
20, 20A: energy storage unit
21: fastening tool
22: adhesive material
30: holder
41, 42, 200: bus bar
50: thermistor
100: energy storage device
110: container
120: positive electrode terminal
130: negative electrode terminal
300, 310, 320, 320A, 320B: spacer
301, 701: screw
320a, 711a, 712a: through hole
320b: opening
320c: recessed portion
321: base plate (first base plate)
321a: peripheral portion
322: projecting portion
323: first wall portion
324, 326: second wall portion
325: second base plate
400: sandwiching member
500: binding member
600: bus bar frame
700: heat shielding plate
710: spacer mounting portion
711: first contact portion
712: second contact portion

The invention claimed is:

1. An energy storage apparatus, comprising:
one or more energy storage devices;
an outer case;
a plate-like spacer disposed between an energy storage device disposed at an end among the one or more energy storage devices and the outer case;
an end plate disposed on a side of the energy storage device disposed at the end among the one or more energy storage devices;
a binding member attached to the end plate by an end portion of the binding member, the binding member binding the one or more energy storage devices; and
a spacer mounting portion disposed between the end plate and the plate-like spacer,
wherein the plate-like spacer is disposed between the end plate and the outer case and is arranged outside of the end portion of the binding member,
wherein the plate-like spacer and the end plate are spaced apart from each other,
wherein a space is formed between the plate-like spacer and the end plate,
wherein the plate-like spacer is fastened to the end plate by a fixing portion, and
wherein the fixing portion is attached to the plate-like spacer and the spacer mounting portion.

2. The energy storage apparatus according to claim 1, wherein the outer case includes a body portion and a lid portion, and
wherein the plate-like spacer is disposed between the end plate and a side wall of the body portion.

3. The energy storage apparatus according to claim 1, wherein the plate-like spacer is disposed at a position which is parallel to the end plate.

4. The energy storage apparatus according to claim 1, wherein the end plate comprises two end plates which are positioned so as to oppositely face each other and sandwich the one or more energy storage devices,
wherein the plate-like spacer comprises two spacers, one of the two spacers being disposed between one of the two end plates and the outer case, and an other one of the two spacers being disposed between an other one of the two end plates and the outer case,
wherein the space is formed between the one of the two spacers and the one of two end plates, and
wherein an other space is formed between the other one of the two spacers and the other one of the two end plates.

5. The energy storage apparatus according to claim 1, wherein the plate-like spacer includes a base plate which extends in an oppositely facing manner with the end plate, and a projecting portion projecting from the base plate.

6. The energy storage apparatus according to claim 5, wherein the base plate includes a first base plate disposed on an end plate side of the projecting portion.

7. The energy storage apparatus according to claim 6, wherein the base plate further includes a second base plate disposed on an outer case side of the projecting portion.

8. The energy storage apparatus according to claim 5, wherein the projecting portion includes a plurality of wall portions extending along a surface of the base plate.

9. The energy storage apparatus according to claim 8, wherein the plurality of wall portions includes a plurality of first wall portions, and a plurality of second wall portions extending between the plurality of first wall portions.

10. The energy storage apparatus according to claim 1, wherein the plate-like spacer includes an opening in which a fastening portion of the outer case with the end plate is disposed.

11. The energy storage apparatus according to claim 1, wherein the outer case includes a strip-shaped rib on a surface thereof which oppositely faces the plat-like spacer, and
wherein the plate-like spacer includes a recessed portion in which the rib is disposed.

12. The energy storage apparatus according to claim 1, wherein the plate-like spacer is fixed to the outer case.

13. The energy storage apparatus according to claim 1, wherein a rib is disposed on a surface of the outer case, the plate-like spacer facing the surface of the outer case.

14. The energy storage apparatus according to claim 13, wherein the plate-like spacer includes a recessed portion in which the rib is disposed.

15. The energy storage apparatus according to claim 1, wherein the plate-like spacer and the outer case are spaced apart from each other.

16. The energy storage apparatus according to claim 15, wherein the plate-like spacer comprises an insulating material.

17. An energy storage apparatus, comprising:
one or more energy storage devices;
an outer case;
a spacer disposed between an energy storage device disposed at an end among the one or more energy storage devices and the outer case;
an end plate disposed on a side of the energy storage device disposed at the end among the one or more enemy storage devices;
a binding member attached to the end late by an end portion of the binding member, the binding member binding the one or more energy storage devices; and
a spacer mounting portion disposed between the end plate and the spacer, wherein the spacer is disposed between the end plate and the outer case and is arranged outside of the end portion of the binding member, wherein the spacer and the outer case are spaced apart from each other, wherein a space is formed between the spacer and the outer case, wherein the spacer is fastened to the end plate by a fixing portion, and wherein the fixing portion is attached to the spacer and the spacer mounting portion.

18. The energy storage apparatus according to claim 17, wherein a rib is disposed on a surface of the outer case, the spacer facing the surface of the outer case, and wherein the spacer includes a recessed portion in which the rib is disposed.

\* \* \* \* \*